(12) United States Patent
Toley et al.

(10) Patent No.: US 9,819,588 B1
(45) Date of Patent: Nov. 14, 2017

(54) TECHNIQUES FOR MONITORING A SERVER

(75) Inventors: Abhijit Toley, Maharashtra (IN); Amit Gaurav, Maharashtra (IN); Amol Shivram Katkar, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 1199 days.

(21) Appl. No.: 13/330,208

(22) Filed: Dec. 19, 2011

(51) Int. Cl.
*G06F 15/16* (2006.01)
*G06F 15/173* (2006.01)
*H04L 12/801* (2013.01)

(52) U.S. Cl.
CPC .................... *H04L 47/10* (2013.01)

(58) Field of Classification Search
CPC ....................................... H04L 47/10
USPC ................ 709/206, 226, 227, 217
See application file for complete search history.

(56) References Cited

U.S. PATENT DOCUMENTS

| | | | | |
|---|---|---|---|---|
| 5,329,619 A * | 7/1994 | Page et al. | | 709/203 |
| 6,272,648 B1 * | 8/2001 | Findlay et al. | | 714/4.12 |
| 2003/0018927 A1 * | 1/2003 | Gadir | | G06F 11/2005 714/4.11 |
| 2003/0126202 A1 * | 7/2003 | Watt | | 709/203 |
| 2003/0227912 A1 * | 12/2003 | Kachi | | 370/352 |
| 2007/0165624 A1 * | 7/2007 | Saito et al. | | 370/389 |
| 2007/0168693 A1 * | 7/2007 | Pittman | | 714/4 |
| 2007/0226294 A1 * | 9/2007 | Pruitt et al. | | 709/203 |
| 2007/0281704 A1 * | 12/2007 | Lin et al. | | 455/445 |
| 2008/0270256 A1 * | 10/2008 | Caballero et al. | | 705/26 |
| 2009/0063509 A1 * | 3/2009 | Lockhart et al. | | 707/10 |
| 2010/0306370 A1 * | 12/2010 | Taniguchi | | 709/224 |
| 2010/0312882 A1 * | 12/2010 | Taniguchi | | 709/224 |
| 2011/0107358 A1 * | 5/2011 | Shyam | | G06F 9/5027 719/330 |
| 2013/0031238 A1 * | 1/2013 | Grossklas et al. | | 709/224 |

\* cited by examiner

*Primary Examiner* — Karen Tang
(74) *Attorney, Agent, or Firm* — Wilmer Cutler Pickering Hale and Dorr LLP (57) ABSTRACT

Techniques for monitoring a server are disclosed. In one particular exemplary embodiment, the techniques may be realized as a system and method for monitoring a server. The method may comprise monitoring, using a monitoring module communicatively coupled to a network, data traffic at a server. The method may also comprise identifying a lack of data traffic during a predetermined period of time. The method may further comprise generating at least one notification based on the lack of data traffic. The method may also comprises transmitting the at least one notification to a server agent, wherein the server agent places at least one call to the server to verify status of the server.

22 Claims, 6 Drawing Sheets

TECHNIQUES FOR MONITORING A SERVER

FIELD OF THE DISCLOSURE

The present disclosure relates generally to network monitoring and, more particularly, to techniques for monitoring a server.

BACKGROUND OF THE DISCLOSURE

Network File System (NFS) servers are typically used to host, among other things, boot images for a large number of virtual machines. Remote Procedure Calls (RPC) are periodically made by a monitoring agent to determine health or state of the NFS server. However, during a boot-storm, i.e., when hundreds of virtual machines are booting up at the same time from an NFS server, RPC calls may not adequately monitor the state of the NFS server because the NFS server may be overloaded. For example, the RPC calls may time out and report the NFS server as faulted. In addition, these RPC calls may add to the existing load at the NFS server. As a result, monitoring a server using traditional RPC calls may not be entirely accurate, efficient, or reliable.

In view of the foregoing, it may be understood that there may be significant problems and shortcomings associated with current monitoring of server health.

SUMMARY OF THE DISCLOSURE

Techniques for monitoring a server are disclosed. In one particular exemplary embodiment, the techniques may be realized as a method for monitoring a server. The method may comprise monitoring, using a monitoring module communicatively coupled to a network, data traffic at a server. The method may also comprise identifying a lack of data traffic during a predetermined period of time. The method may further comprise generating at least one notification based on the lack of data traffic. The method may also comprises transmitting the at least one notification to a server agent, wherein the server agent places at least one call to the server to verify status of the server.

In accordance with other aspects of this particular exemplary embodiment, the server may be a Network File System (NFS) server.

In accordance with further aspects of this particular exemplary embodiment, the monitoring module may comprise a snooper module configured to monitor data packets being communicated to or from the server. The data packets may be associated with Remote Procedure Calls (RPC).

In accordance with additional aspects of this particular exemplary embodiment, the predetermined period of time may be configurable. The predetermined period of time may be in the order of seconds.

In accordance with other aspects of this particular exemplary embodiment, the at least one notification may comprise information associated with the server and the lack of data traffic.

In accordance with further aspects of this particular exemplary embodiment, the at least one call may be a Remote Procedure Call (RPC).

In another particular exemplary embodiment, the techniques may be realized as a system for monitoring a server. The system may comprise one or more processors communicatively coupled to memory and a network. The one or more processors may be configured to monitor data traffic at a server. The one or more processors may also be configured to identify a lack of data traffic during a predetermined period of time. The one or more processors may further be configured to generate at least one notification based on the lack of data traffic. The one or more processors may additionally be configured to transmit the at least one notification to a server agent, wherein the server agent places at least one call to the server to verify status of the server.

In accordance with additional aspects of this particular exemplary embodiment, the server may be a Network File System (NFS) server.

In accordance with other aspects of this particular exemplary embodiment, the one or more processors may be configured to monitor data packets being communicated to or from the server. The data packets may be associated with Remote Procedure Calls (RPC).

In accordance with further aspects of this particular exemplary embodiment, the predetermined period of time may be configurable. The predetermined period of time may be in the order of seconds.

In accordance with additional aspects of this particular exemplary embodiment, the at least one notification may comprise information associated with the server and the lack of data traffic.

In accordance with other aspects of this particular exemplary embodiment, the at least one call may be a Remote Procedure Call (RPC).

In another particular exemplary embodiment, the techniques may be realized as a method for monitoring a server. The method may comprise receiving, using a server agent communicatively coupled to a network, at least one notification from a monitoring module associated with a server. The method may also comprise placing at least one call to the server to verify a status of the server based on the at least one notification In accordance with additional aspects of this particular exemplary embodiment, the server may be a Network File System (NFS) server.

In accordance with other aspects of this particular exemplary embodiment, the at least one notification may comprise information associated with a lack of data traffic during a predetermined period of time at the server.

In accordance with further aspects of this particular exemplary embodiment, the at least one call may be a Remote Procedure Call (RPC).

In yet another particular exemplary embodiment, the techniques may be realized as a system for monitoring a server. The system may comprise one or more processors communicatively coupled to memory and a network. The one or more processors may be configured to receive at least one notification from a monitoring module associated with a server. The one or more processors may be configured to place at least one call to the server to verify a status of the server based on the at least one notification.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
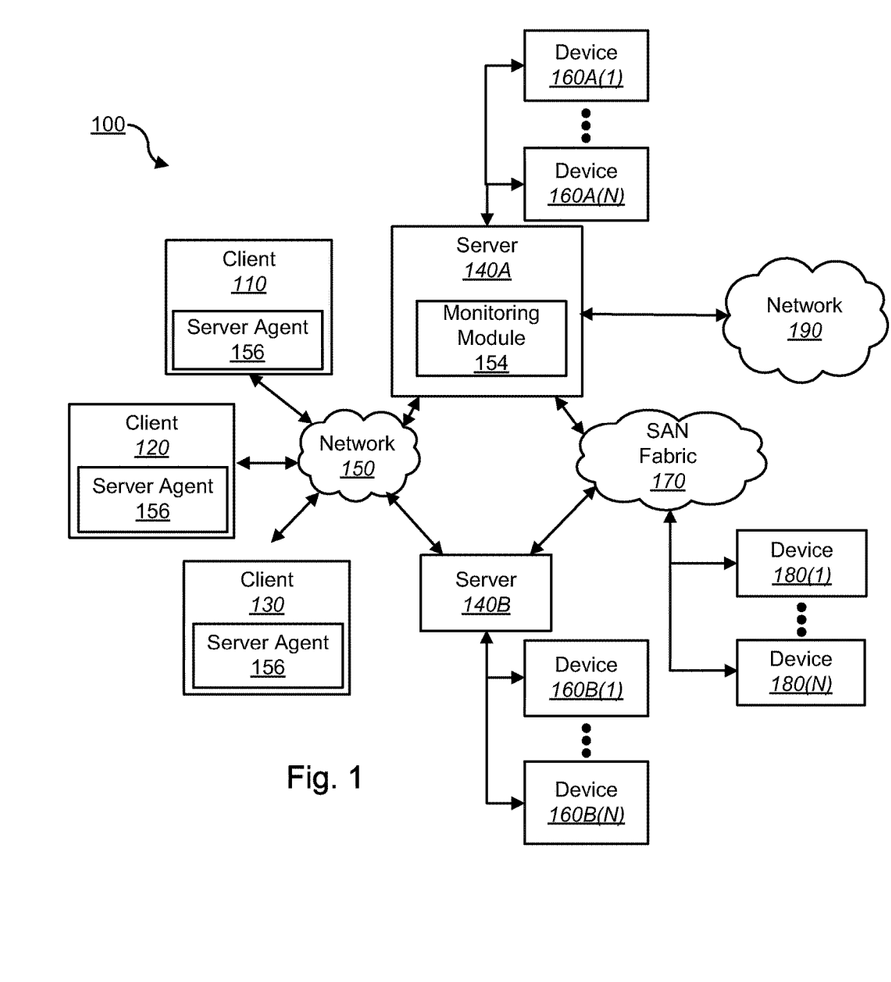
FIG. 1 shows a block diagram depicting a network architecture for monitoring a server, in accordance with an embodiment of the present disclosure.

FIG. 1 shows a block diagram depicting a network architecture 100 for monitoring a server, in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a monitoring module (e.g., monitoring module 154 of server 140A). In some embodiments, servers 140A and 140B may be communicatively coupled to a monitoring module. Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 3:
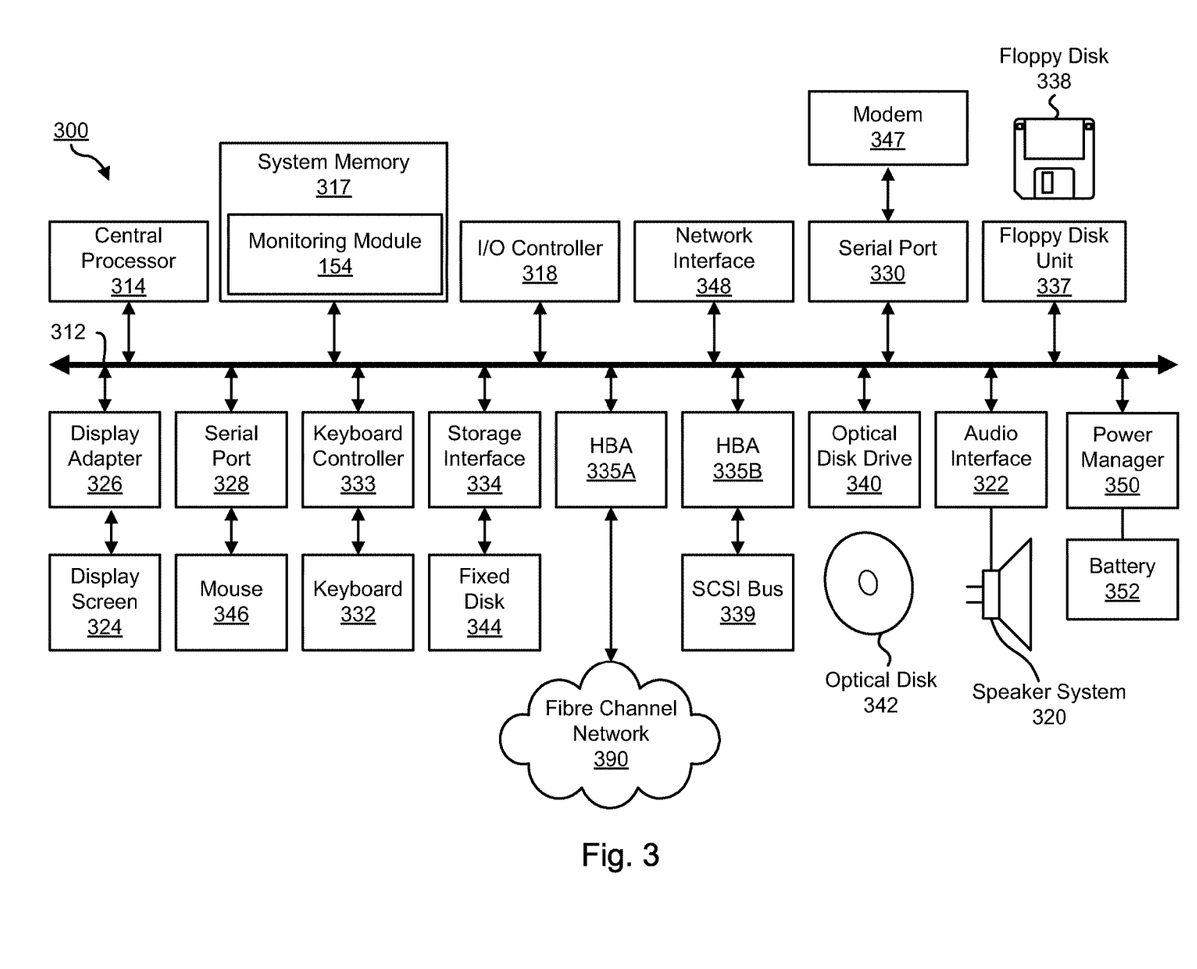
FIG. 3 depicts a module for monitoring a server, in accordance with an embodiment of the present disclosure.

With reference to computer system 300 of FIG. 3, modem 347, network interface 348, or some other method may be used to provide connectivity from one or more of client systems 110, 120 and 130 to network 150. Client systems 110, 120 and 130 may be able to access information on server 140A or 140B using, for example, a web browser or other client software, such as a server agent 156. Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks (RAID), magnetic tape, disk, a storage area network (SAN), an internet small computer systems interface (iSCSI) SAN, a Fibre Channel SAN, a common Internet File System (CIFS), network attached storage (NAS), a network file system (NFS), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, Network File System (NFS) servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may also contain one or more portions of software for monitoring a server, such as a monitoring module 154. As illustrated, one or more portions of monitoring module 154 may reside at a network centric location. For example, server 140A may be a server (e.g., an NFS Server), a firewall, a gateway, or other network element that may perform one or more actions, including but not limited to, monitoring a server. One or more portions of the monitoring module 154 may reside outside of the server 140A. For example, one or more portions of the monitoring module 154 may be a stand-alone device, reside at one or more clients (e.g., 110, 120, and 130), or at another location within the network. According to some embodiments, network 190 may be an external network (e.g., the Internet).

Figure 2:
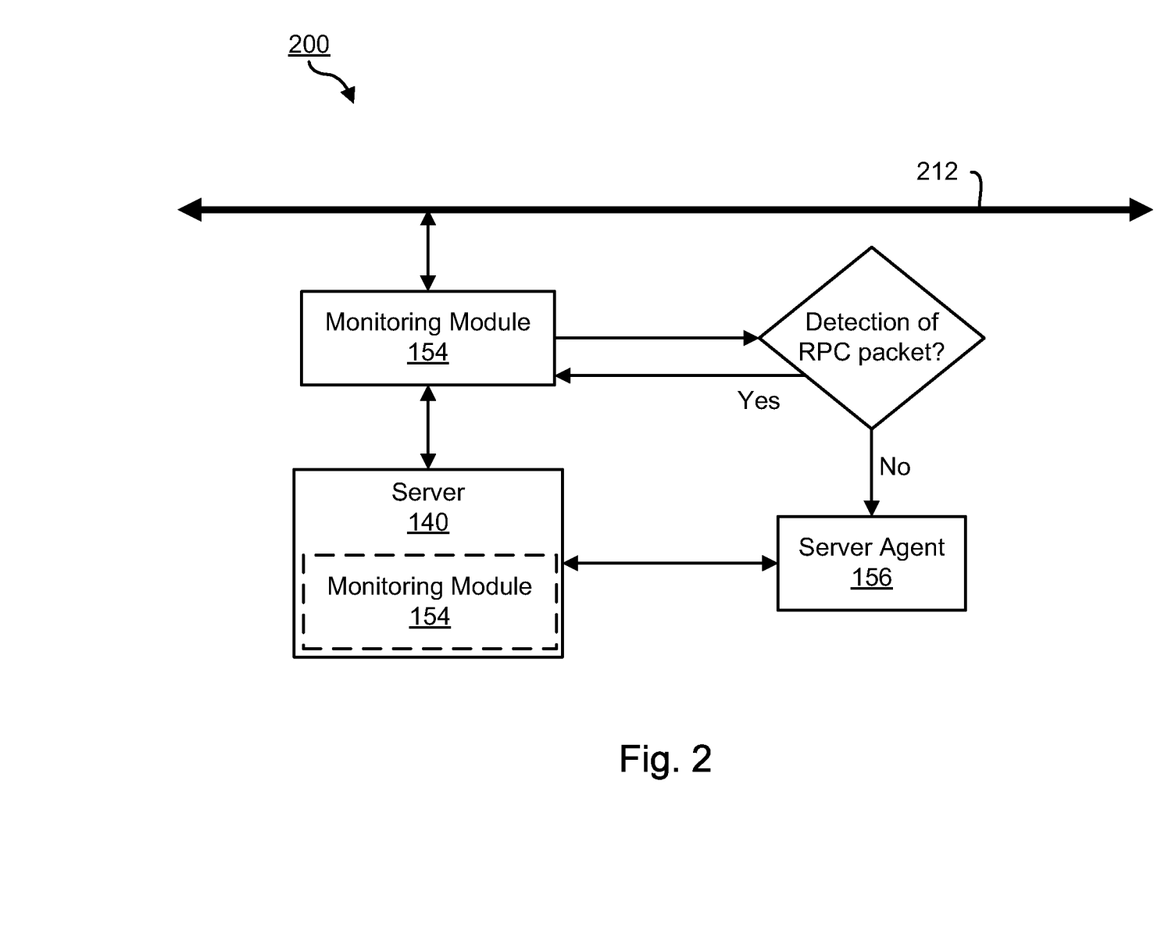
FIG. 2 depicts a block diagram of a computer system for monitoring a server, in accordance with an embodiment of the present disclosure.

FIG. 2 depicts a schematic flow 200 for monitoring a server, in accordance with an embodiment of the present disclosure. As discussed above, a server 140 may be considered active when the server 140 continuously transmits and/or receives data. Remote Procedure Calls (RPC) may be periodically made by a server agent 156 to determine health or state of the server (e.g., an NFS server). However, during a boot-storm, i.e., when hundreds of virtual machines are booting up at the same time, RPC calls may not adequately monitor the state of the server because the server may be overloaded. For example, the RPC calls may time out and report the server as faulted. Therefore, the server 140 may comprise a monitoring module 154 that monitors data traffic to/from the server 140 with the network 212. If no traffic is detected for a predetermined amount of time, it may be presumed that the server 140 is not active.

The server agent 156 may be communicatively coupled to the monitoring module 154. In this way, if no activity is identified by the monitoring module 154 (e.g., no traffic to or from the server is detected), the monitoring module 154 may send one or more notifications to the server agent 156. The one or more notifications may be sent after predetermined intervals to communicate that there no detectable traffic at the server 140. In some embodiments, the server agent 156 may then place one or more RPC calls to verify and/or confirm status of the server 140.

It should be appreciated that by placing RPC calls when one or more notifications are received from the monitoring module 154, there may be an overall reduction and/or elimination of scheduled periodic RPC calls by the server agent 156. As discussed above, these RPC calls may add to the existing load at the NFS server. Furthermore, periodic (and generally frequent) RPC calls may not be entirely accurate, efficient, or reliable. By using a monitoring module 154 to regularly monitor traffic at the server 140, the RPC calls that are placed by the server agent 156 may not overload the server and provide greater reliability.

It should also be appreciated that if traffic at the server is steady, the monitoring module 154 may not need to communicate with the server agent 156. No notification may be sent and the server agent may not place any RPC calls to the server 140. In some embodiments, it may be useful for the monitoring module to provide notifications to the server agent 156 simply to communicate that the server 140 is active and there is traffic passing through the server 140.

FIG. 3 depicts a block diagram of a computer system 300 in accordance with an embodiment of the present disclosure. Computer system 300 may be suitable for implementing techniques in accordance with the present disclosure. Computer system 300 may include a bus 312 which may interconnect major subsystems of computer system 300, such as a central processor 314, a system memory 317 (e.g. RAM (Random Access Memory), ROM (Read Only Memory), flash RAM, or the like), an Input/Output (I/O) controller 318, an external audio device, such as a speaker system 320 via an audio output interface 322, an external device, such as a display screen 324 via display adapter 226, serial ports 328 and 330, a keyboard 332 (interfaced via a keyboard controller 333), a storage interface 334, a floppy disk drive 337 operative to receive a floppy disk 338, a host bus adapter (HBA) interface card 335A operative to connect with a Fibre Channel network 390, a host bus adapter (HBA) interface card 335B operative to connect to a SCSI bus 339, and an optical disk drive 340 operative to receive an optical disk 342. Also included may be a mouse 346 (or other point-and-click device, coupled to bus 312 via serial port 328), a modem 347 (coupled to bus 312 via serial port 330), network interface 348 (coupled directly to bus 312), power manager 350, and battery 352.

Bus 312 allows data communication between central processor 314 and system memory 317, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 300 may be stored on and accessed via a computer readable medium, such as a hard disk drive (e.g., fixed disk 344), an optical drive (e.g., optical drive 340), a floppy disk unit 337, or other storage medium. For example, monitoring module 154 may be resident in system memory 317.

Storage interface 334, as with the other storage interfaces of computer system 300, may connect to a standard computer readable medium for storage and/or retrieval of information, such as a fixed disk drive 344. Fixed disk drive 344 may be a part of computer system 300 or may be separate and accessed through other interface systems. Modem 347 may provide a direct connection to a remote server via a telephone link or to the Internet via an internet service provider (ISP). Network interface 348 may provide a direct connection to a remote server via a direct network link to the Internet via a POP (point of presence). Network interface 348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 3 need not be present to practice the present disclosure. The devices and subsystems can be interconnected in different ways from that shown in FIG. 3. Code to implement the present disclosure may be stored in computer-readable storage media such as one or more of system memory 317, fixed disk 344, optical disk 342, or floppy disk 338. Code to implement the present disclosure may also be received via one or more interfaces and stored in memory. The operating system provided on computer system 300 may be MS-DOS®, MS-WINDOWS®, OS/2®, OS X®, UNIX®, Linux®, or another known operating system.

Power manager 350 may monitor a power level of battery 352. Power manager 350 may provide one or more APIs (Application Programming Interfaces) to allow determination of a power level, of a time window remaining prior to shutdown of computer system 300, a power consumption rate, an indicator of whether computer system is on mains (e.g., AC Power) or battery power, and other power related information. According to some embodiments, APIs of power manager 350 may be accessible remotely (e.g., accessible to a remote backup management module via a network connection). According to some embodiments, battery 352 may be an Uninterruptable Power Supply (UPS) located either local to or remote from computer system 300. In such embodiments, power manager 350 may provide information about a power level of a UPS.

Figure 4:
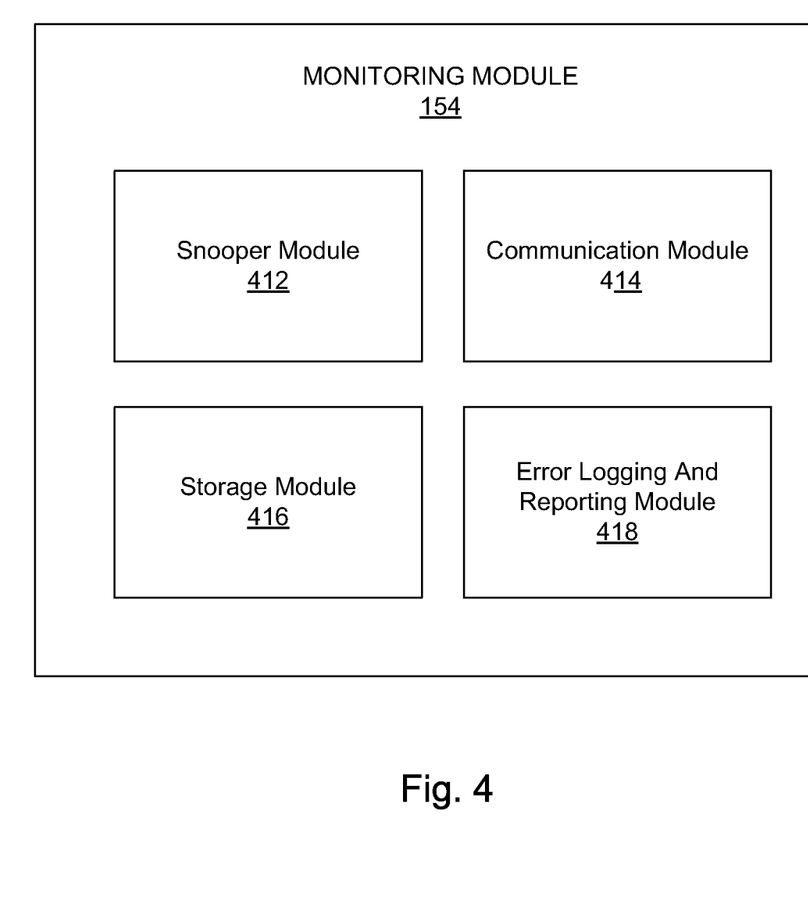
FIG. 4 depicts a schematic flow for monitoring a server, in accordance with an embodiment of the present disclosure.

FIG. 4 depicts a module 154 for monitoring a server, in accordance with an embodiment of the present disclosure. Referring to FIG. 4, the monitoring module 154 may comprise a variety of sub-modules or sub-components to monitor a server. For example, the monitoring module 154 may comprise one or more a snooper module 412, a communication module 414, a storage module 416, and an error logging and reporting module 418.

The description below describes network elements, computers, and/or components of a system and method for monitoring a server that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The snooper module 412 may "snoop" or detect packets being transmitted to and/or from the server 140. The snooper module 412 may operate continuously or periodically, e.g., at predetermined intervals. In some embodiments, the snooper module 412 may be configured to recognize and identify data packets (e.g., RPC data packets) being transmitted to or from the server 140. In some embodiments, when there is no traffic detected for a predetermined period of time (e.g., a few seconds), the snooper module 412 may send a notification to a server agent 156 via the communication module 414. As discussed above, the server agent 156, in response to the notification, place an RPC call to the server to verify/confirm the status of the server.

The storage module 416 may store data associated with monitoring a server, and the error logging and reporting module 418 may produce logs, reports, or other information associated with monitoring a server. Other various modules for monitoring a server may also be provided.

It should be appreciated that the monitoring module 154 may be communicatively coupled to the server 140. In some embodiments, the monitoring module 154 may be fully or partially integrated with the server. In other embodiments, the monitoring module 154 may be a stand-alone component in the network. In yet other embodiments, the monitoring module 154 may be communicatively coupled to one or more clients for remote monitoring of the server.

Figure 5A:
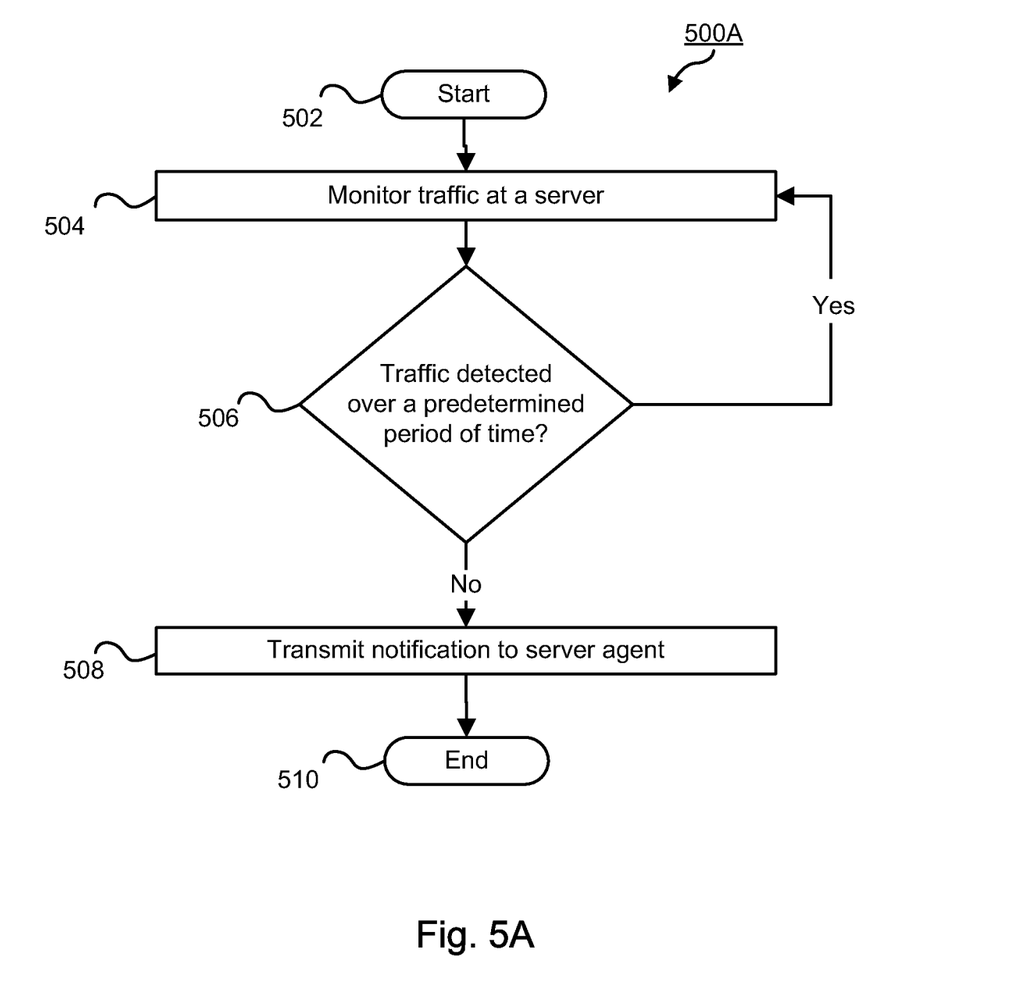
FIGS. 5A-5B depict a method for monitoring a server, in accordance with an embodiment of the present disclosure.

FIG. 5A depicts a method for monitoring a server 500A, in accordance with an embodiment of the present disclosure. The exemplary method 500A is provided by way of example, as there are a variety of ways to carry out methods disclosed herein. The method 500A shown in FIG. 5A may be executed or otherwise performed by one or a combination of various systems. The method 500A is described below as carried out by at least system 100 in FIG. 1, architecture 200 in FIG. 2, and module 154 in FIG. 4, by way of example, and various elements of system 100 are referenced in explaining the exemplary method of FIG. 5A. Each block shown in FIG. 5A represents one or more processes, methods, or subroutines carried in the exemplary method 500A. A computer readable medium comprising code to perform the acts of the method 500A may also be provided. Referring to FIG. 5A, the exemplary method 500A may begin at block 502.

At block 502, the method 500A may begin.

At block 504, the monitoring module 154 may monitor data traffic at a server 140. In some embodiments, the server may be a Network File System (NFS) server.

At block 506, data traffic at the server 140 may be monitored continuously. In the event data traffic is continuous at the server 140, the monitoring module may continue to monitor the server. In the event data traffic is not continuous over a predetermined period of time or particular time interval, the monitoring module may perform additional actions.

For example, the monitoring module 154 may generate and/or transmit at least one notification. The notification generated may be based on the lack of data traffic at the server. As discussed above, lack of data traffic over a predetermined period of time may represent inactivity of a server (e.g., failure, overload, or other server condition).

In some embodiments, the data packets may be Remote Procedure Call (RPC) data packets. The predetermined period of time or particular time interval may be configurable, e.g., in the order of seconds, minutes, hours, days, etc.

At block 508, the monitoring module 154 may generate and/or transmit the notification to a server agent 156. The server agent 156 may place a call (e.g., an RPC call) to the server to verify status of the server.

At block 510, the method 500A may end.

Figure 5B:
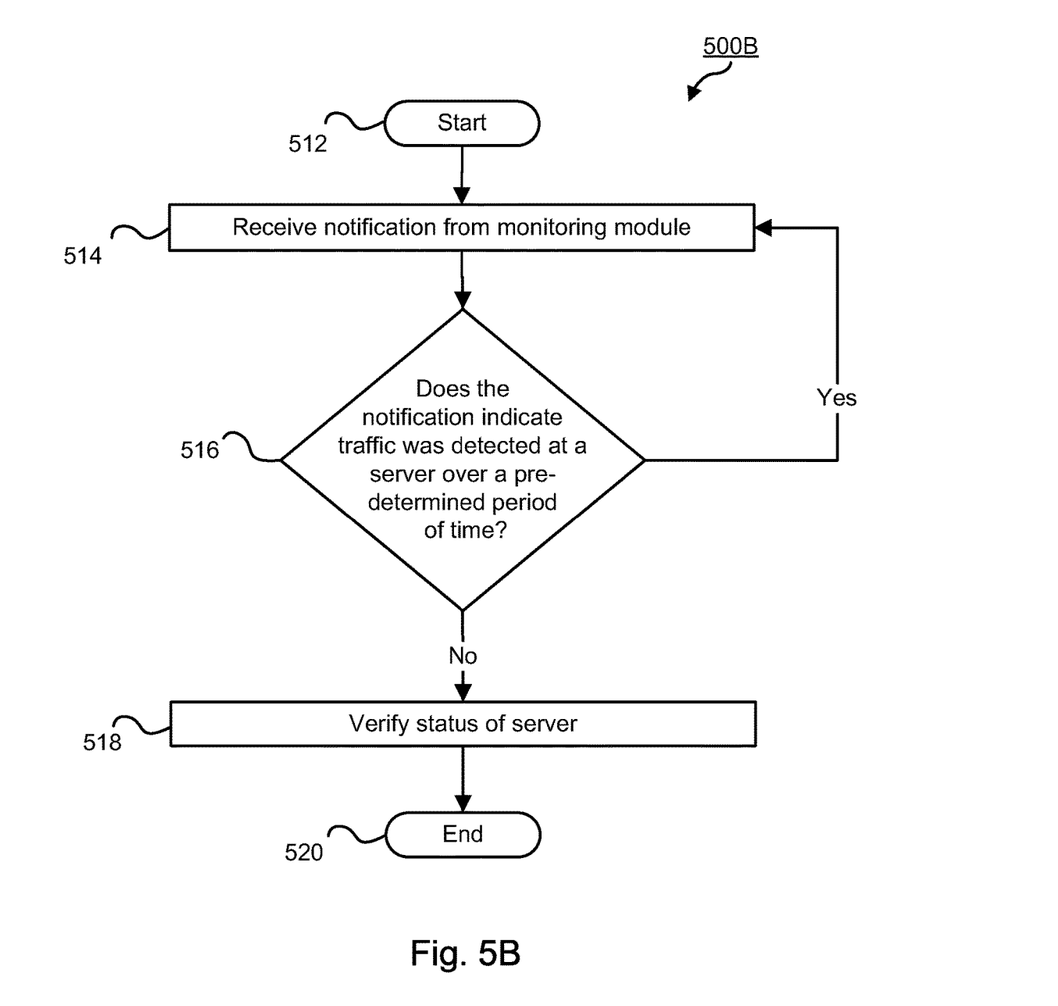

FIG. 5B depicts a method for monitoring a server 400A, in accordance with an embodiment of the present disclosure. The exemplary method 500B is provided by way of example, as there are a variety of ways to carry out methods disclosed herein. The method 500B shown in FIG. 5B may be executed or otherwise performed by one or a combination of various systems. The method 500B is described below as carried out by at least system 100 in FIG. 1, architecture 200 in FIG. 2, and module 154 in FIG. 4, by way of example, and various elements of system 100 are referenced in explaining the exemplary method of FIG. 5B. Each block shown in FIG. 5B represents one or more processes, methods, or subroutines carried in the exemplary method 500B. A computer readable medium comprising code to perform the acts of the method 500B may also be provided. Referring to FIG. 5B, the exemplary method 500B may begin at block 512.

At block 512, the method 500B may begin.

At block 514, a server agent 156 may receive at least one notification from a monitoring module 154 associated with a server 140.

At block 516, the server agent 156 may determine whether the notification indicates a lack of data traffic at the server 140. As discussed above, lack of data traffic over a predetermined period of time may represent inactivity of a server (e.g., failure, overload, or other server condition). In some embodiments, the notification may indicate that server is operating normally and the server agent 156 may return to performing its usual functions and features.

At block 518, the server agent 156 may place at least one call to the server 140 based on the notification to verify status of the server. The server 140 may response to the RPC call and based on the response, the server agent 156 may determined whether the server is active, failed, or experiencing some other server condition.

At block 520, the method 500B may end.

At this point it should be noted that monitoring a server in accordance with the present disclosure as described above typically involves the processing of input data and the generation of output data to some extent. This input data processing and output data generation may be implemented in hardware or software. For example, specific electronic components may be employed in a monitoring module or similar or related circuitry for implementing the functions associated with monitoring a server in accordance with the present disclosure as described above. Alternatively, one or more processors operating in accordance with instructions may implement the functions associated with monitoring a server in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for monitoring a server comprising:
   monitoring, using a monitoring module communicatively coupled to a network, data traffic at a server;
   identifying, using the monitoring module, a lack of data traffic during a predetermined period of time;
   generating, using the monitoring module, at least one notification based on the lack of data traffic;
   transmitting, using the monitoring module, the at least one notification to a server agent located separate from the server; and
   in response to the at least one notification, either causing the server agent to place at least one Remote Procedure Call (RPC) to the server to verify a status of the server if the server agent determines that the at least one notification indicates a lack of data traffic at the server during the predetermined period of time or causing the server agent to operate normally and not place an RPC to the server if the server agent determines that the at least one notification indicates the server is operating normally thereby reducing or eliminating RPCs to the server.

2. The method of claim 1, wherein the server is a Network File System (NFS) server.

3. The method of claim 1, wherein the monitoring module comprises a snooper module configured to monitor data packets being communicated to or from the server.

4. The method of claim 3, wherein the data packets are associated with Remote Procedure Calls (RPC).

5. The method of claim 1, wherein the predetermined period of time is configurable.

6. The method of claim 5, wherein the predetermined period of time is in the order of seconds.

7. The method of claim 1, wherein the at least one notification comprises information associated with the server and the lack of data traffic.

8. The method of claim 1, further comprising:
   receiving a response to the at least one Remote Procedure Call (RPC) from the server at the server agent; and
   determining the status of the server based upon the response.

9. A non-transitory computer readable medium comprising code, which, when executed at a computer processor, performs the method of claim 1.

10. A system for monitoring a server, the system comprising:
    one or more processors communicatively coupled to memory and a network, wherein the one or more processors are configured to:
    monitor data traffic at a server;
    identify a lack of data traffic during a predetermined period of time;
    generate at least one notification based on the lack of data traffic;
    transmit the at least one notification to a server agent located separate from the server; and
    in response to the at least one notification, either causing the server agent to place at least one Remote Procedure Call (RPC) to the server to verify a status of the server if the server agent determines that the at least one notification indicates a lack of data traffic at the server during the predetermined period of time or causing the server agent to operate normally and not place an RPC to the server if the server agent determines that the at least one notification indicates the server is operating normally thereby reducing or eliminating RPCs to the server.

11. The system of claim 10, wherein the server is a Network File System (NFS) server.

12. The system of claim 10, wherein the one or more processors are configured to monitor data packets being communicated to or from the server.

13. The system of claim 12, wherein the data packets are associated with Remote Procedure Calls (RPC).

14. The system of claim 10, wherein the predetermined period of time is configurable.

15. The system of claim 14, wherein the predetermined period of time is in the order of seconds.

16. The system of claim 10, wherein the at least one notification comprises information associated with the server and the lack of data traffic.

17. The system of claim 10, wherein the one or more processors are configured to:
    receive a response to the at least one Remote Procedure Call (RPC) from the server at the server agent; and
    determine the status of the server based upon the response.

18. A method for monitoring a server comprising:
    receiving at a server agent at least one notification from a monitoring module associated with a server, wherein the server agent is located separate from the server, and wherein the at least one notification is based on a lack of data traffic at the server; and
    in response to the at least one notification, either transmitting at least one Remote Procedure Call (RPC) from the server agent to the server to verify a status of the server if the server agent determines that the at least one notification indicates a lack of data traffic at the server during a predetermined period of time or not transmitting an RPC to the server if the server agent determines that the at least one notification indicates the server is operating normally thereby reducing or eliminating RPCs to the server.

19. The method of claim 18, wherein the server is a Network File System (NFS) server.

20. The method of claim 19, wherein the at least one notification comprises information associated with the lack of data traffic during a predetermined period of time at the server.

21. The method of claim 19, further comprising:
    receiving a response to the at least one Remote Procedure Call (RPC) from the server at the server agent; and
    determining the status of the server based upon the response.

22. A system for monitoring a server, the system comprising:

one or more processors communicatively coupled to memory and a network, wherein the one or more processors are configured to:
- receive at a server agent at least one notification from a monitoring module associated with a server, wherein the server agent is located separate from the server, and wherein at least one notification is based on a lack of data traffic at the server; and
- in response to the at least one notification, either transmitting at least one Remote Procedure Call (RPC) from the server agent to the server to verify a status of the server if the server agent determines that the at least one notification indicates a lack of data traffic at the server during a predetermined period of time or not transmitting an RPC to the server if the server agent determines that the at least one notification indicates the server is operating normally thereby reducing or eliminating RPCs to the server.

* * * * *